Feb. 26, 1957 G. H. HANNON 2,782,892
TRANSMISSION MECHANISM EMPLOYING A POSITIVE
CLUTCH ENGAGING ELEMENT
Filed Feb. 17, 1954 2 Sheets-Sheet 1

INVENTOR.
Gilbert H. Hannon
BY
Warren F. B. Lindsey
ATTORNEY

INVENTOR.
Gilbert N. Hannon
BY Warren F. B. Lindsay
ATTORNEY

United States Patent Office 2,782,892
Patented Feb. 26, 1957

2,782,892

TRANSMISSION MECHANISM EMPLOYING A POSITIVE CLUTCH ENGAGING ELEMENT

Gilbert H. Hannon, Green Bay, Wis.

Application February 17, 1954, Serial No. 410,890

13 Claims. (Cl. 192—30)

This invention relates to transmission mechanisms and more particularly to a clutch or coupling device for operatively connecting and disconnecting drive and driven members.

In machines where the flow of mechanical power is controlled through clutches, efficient performance and flexibility of operation depend largely upon clutch characteristics. Although the positive multiple jaw type clutch is used in some light and medium weight machinery, its use is limited to applications where very low rotary speeds are encountered.

In the operation of heavy machinery such as commonly used in the building and transportation industries and in the power utilities, transmission mechanisms employing jaw type clutches have been used. These jaw type clutches are unsatisfactory because it is difficult and sometimes impossible to bring the clutch elements into clutching engagement with each other while the drive unit is operating without subjecting the teeth of the jaw to tangential impacts. Such impacts greatly reduce the useful life of the teeth. Therefore it is often necessary to stop the device or to reduce its speed of operation to bring the clutch elements into clutching engagement, thereby resulting in lower operating efficiencies. Although the positive multiple jaw type clutch assumes exact rotary speed without slippage, the drive and driven members can be engaged in a multiple of different peripheral positions with respect to each other and therefore are limited in use in timing applications.

Friction type clutches heretofore known for transmission mechanisms controlling small units of power have also been unsatisfactory because these devices have been costly, heavy, bulky and over size in comparison with their associated equipment and because these devices depend upon the condition of given frictional surfaces for their operating efficiencies. Further disadvantages of the friction type clutch are that they cannot be depended upon for applications requiring exact rotary speeds and they cannot be used in applications requiring exact timing between drive and driven elements. In cases of overload in the friction type clutch the slippage of the frictional elements generates heat which is often undesirable. Unless specially constructed this type of clutch becomes unreliable and radical in operation due to the admission of lubricants or other foreign material to the frictional elements.

Therefore, in accordance with the invention claimed, a new and improved transmission mechanism is provided comprising a drive member, a driven member mounted in coaxial relationship with the drive member, a clutch element, and means pivotally connecting the clutch element with only one of the members, for example, the drive member, to move from a position substantially normal to the axis of movement of the drive member to an angular position inclined to the axis of movement of the drive member. Stop means are provided on the driven member to engage the clutch element when moved in a given direction into the angular position and to restrain the clutch element from further angular movement in the given direction. Clutch element engaging means are slidably mounted on the driven member for limited movement along its axis and for rotation with the driven member, and means are further provided for moving the clutch element engaging means into engagement with the clutch element and to move the clutch element to its angular position against the stop to lock the clutch element and the drive and driven members together to move in unison. This new and improved transmission mechanism can be engaged or disengaged at any rotary speed.

It is, therefore, one object of the present invention to provide a new and improved power transmission mechanism employing a clutch device which may be quickly and easily moved into and out of a clutching position without discontinuing or retarding the operation of the drive member.

Another object of this invention is to provide a new and improved clutch device which will transmit more torque in a smaller mechanism than can be transmitted by the commonly used friction type clutches.

A further object of this invention is to provide a new and improved positive clutch transmission mechanism employing drive and driven members which engage in exactly the same peripheral location each time they meet.

A still further object of this invention is to provide a new and improved positive clutch device in which there is negligible frictional drag when the clutch device is in the declutching position.

A still further object of this invention is to provide a new and improved clutch device which can be engaged or disengaged at any rotary speed.

A still further object of this invention is to provide a new and improved positive clutch device employing clutching elements in which the elements may rotate relative to each other in one plane in the declutching position and when moved to another plane rotate in unison.

A still further object of this invention is to provide a new and improved positive clutch device which may employ an overload release and shock absorption mechanism.

A still further object of this invention is to provide a new and improved positive clutch device in which end thrust is controlled so that it is not necessary to hold the clutch in or out of engagement externally.

A still further object of this invention is to provide a new and improved positive clutch device which can be operated submerged in a lubricant such as oil or any other suitable fluid or which may be operated as a dry clutch.

A still further object of this invention is to provide a new and improved transmission mechanism which is simple, durable, and economical in construction and operation.

Other objects and advantages of this invention will become apparent from the following description when read in connection with the accompanying drawings, in which.

Figure 9:
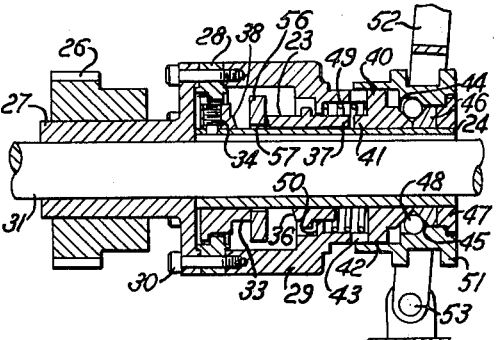
Fig. 9 is a view in elevation, partly in cross section, of the transmission mechanism of Figs. 1 to 5 in combination with actuating and power take-off means and illustrating the clutch in the disengaged position.
Figure 11:
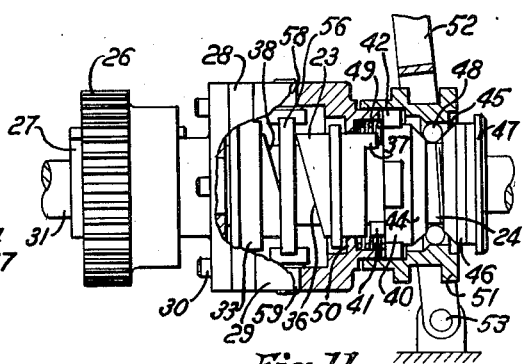
Fig. 11 is a view in elevation partly in cross section of the transmission mechanism illustrated in Fig. 9 wherein the cover and component parts of the drive members are rotated 90 degrees with respect to the driven member and its component parts, clutch element not engaged.
Figure 14:
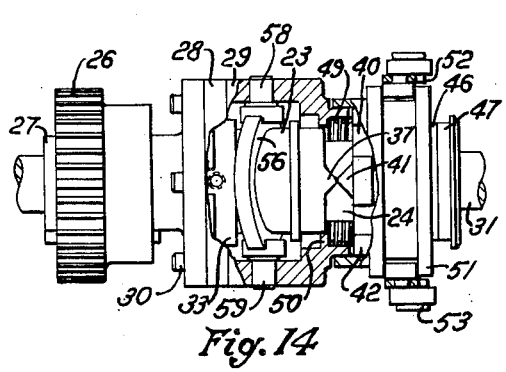
Figure 13:
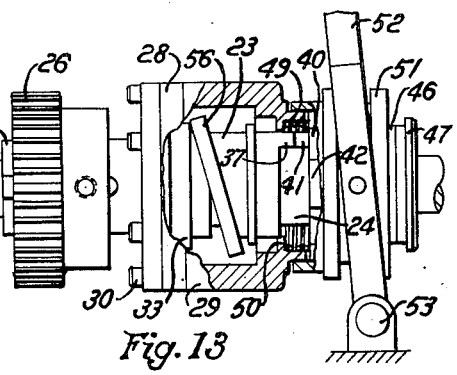

Fig. 13 is a view in elevation, partly in cross section, of the transmission mechanism illustrated in Figs. 9 and 11 wherein the cover of the drive member and its component parts are rotated 270 degrees further than their position illustrated in Fig. 11 with respect to the driven member and its component parts, clutch element now fully engaged; and Fig. 14 is a plan view in elevation partly in cross section, of the embodiment illustrated in Fig. 13.

Figure 1:
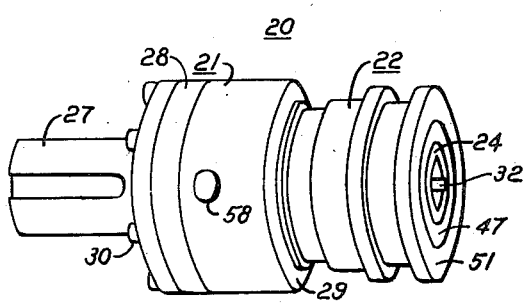
Fig. 1 is a perspective view of a power transmission mechanism embodying the various features of the present invention.
Figure 2:
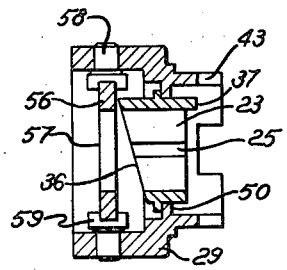
Figs. 2, 3 and 4 are sectional views illustrating the assembly sequence of the transmission mechanism illustrated in Fig. 1.
Figure 3:
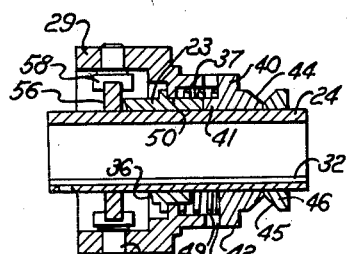
Figure 4:
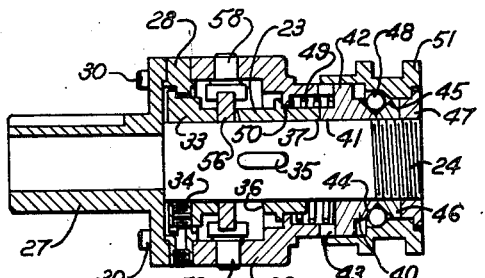
Figure 5:
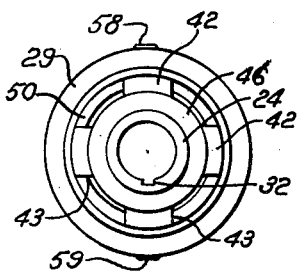
Fig. 5 is an end view of Fig. 3 illustrating the projections on the slip ring which interlock with the cover of the drive member.

Referring more particularly to the drawings by characters of reference, Fig. 1 illustrates a synchronizing clutch transmission mechanism 20 comprising a first rotary unit 21 coaxially arranged with a second rotary unit 22. The second unit 22 includes a positive clutch element engaging means or sleeve 23 (shown in Figs. 2 to 4) carried by a hub 24 to rotate therewith and axially slidable thereof to engage the first rotary unit 21.

The first rotary unit 21 comprising a hub 27, retainer ring 28, cover 29 fastened together by bolts 30 and thrust ring 40 is adapted to be connected to a driving or driven mechanism (not shown) in any suitable manner. Figs. 9 to 14 illustrate one means of connecting unit 21 to a driving or driven mechanism by means of a gear 26 suitably fastened to hub 27. Thrust ring 40 is loosely mounted on and coaxially arranged with hub 24 such that it is free to either rotate or move endwise. Ring 40 is provided along the periphery thereof with a plurality of outwardly projecting lugs 42 slidably engaged in longitudinally extending keyways 43 in cover 29 so as to always rotate with cover 29.

Figure 12:
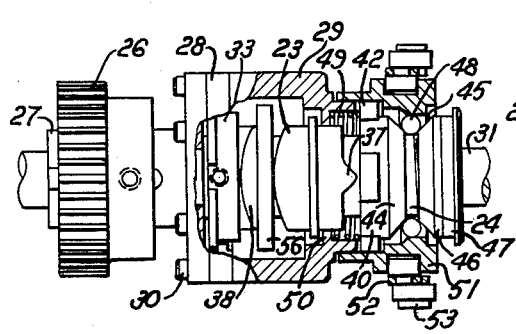
Fig. 12 is a plan view in elevation, partly in cross section, of the embodiment illustrated in Fig. 11.

The second rotary unit 22 comprising the hub 24 is adapted to be secured by any suitable means to a driving or driven mechanism (not shown). Hub 24 is fixed on a shaft 31 (shown in Figs. 9 to 14) in driving connection therewith. An internal keyway 32 in hub 24 is provided for engagement by a driving key in engagement with a mating keyway in shaft 31. The end of hub 24 arranged in unit 21 is provided with a bearing sleeve 33 which is secured to hub 24 by a dog point set screw 34 which projects through sleeve 33 and hub 24 onto a keyway in shaft 31 and secures hub 24 against longitudinal movement relative to shaft 31. Bearing sleeve 33 is formed on the end thereof facing the center of hub 24 to provide an inclined surface 38 as shown in Figs. 9, 11 and 12. Surface 38 may be formed by a plane cutting sleeve 33 at an angular position inclined to the axis of rotation of sleeve 33.

Sleeve 23 comprising a part of unit 22 is mounted on hub 24 by means of external splines 35. Splines 35 set into slots 25 of sleeve 23 provide lengthwise or axial motion of sleeve 23 but prevent sleeve 23 and hub 24 from rotating upon each other. Sleeve 23, defining a cylindrical surface, is formed on the clutch engaging end thereof to provide an inclined surface 36 and on the opposite end thereof a cam projecting surface 37. Surface 36 may be formed by a plane cutting sleeve 23 at an angular position inclined to the axis of rotation of sleeve 23 and cam projecting surface 37 may be formed integral with the cylindrical surface of sleeve 23 to extend axially along hub 24.

Thrust ring 40 forming a part of unit 21 is loosely mounted on and coaxially arranged with hub 24 such that it is free to either rotate or move endwise and is provided with a cam projecting surface 41 formed integral therewith to extend axially along hub 24. Cam projecting surface 41 is arranged to cooperate with cam projecting surface 37 of sleeve 23. Face 44 of ring 40 opposite cam projecting surface 41 diverges outwardly and abuts an outwardly diverging projection surface 45 formed on an adjustment ring 46. A lock nut 47 and the adjustment ring 46 are carried by and in screw threaded engagement with hub 24. Rings 40 and 46 are engaged by an annular series of balls 48. In the released condition of the clutch, the force of a clutch release compression spring 49 arranged between an inwardly extending flange 50 or cover 29 and thrust ring 40 forces ring 40 toward ring 46, thus forcing the balls 48 radially outward, their outward movement being limited in this instance by a shipper sleeve 51. The shipper sleeve 51 is slidably and rotatably fitted over balls 48, rings 40 and 46 and a hub cover 29 of unit 21 and is connected in any suitable manner with a clutch throw lever 52. Lever 52 is provided for reciprocating the shipper sleeve 51.

The rotary unit 21 comprising hub 27, retainer ring 28, cover 29 and ring 40 may be considered the drive unit and is provided to be synchronized with rotary unit 22 comprising shaft 31, hub 24, bearing sleeve 33, sleeve 23, and adjustment ring 46 which may be considered the driven unit by means of a synchronizing clutch element 55.

Clutch element 55 is interposed between bearing sleeve 33 and sleeve 23 for rotary movement with unit 21 and comprises a disk 56 having an aperture 57 extending therethrough and a pair of diametrically disposed trunnions 58 and 59 provided on the circumference of disk 56.

As shown in Figs. 1 to 4 the trunnions 58 and 59 may be loosely mounted in bearing openings in cover 29 of unit 21 or in retaining ring 28 to provide for pivotal or rotary movement of disk 56 from a position substantially normal to the axis of movement of unit 21 to an angular position inclined to the axis of movement of cover 29. The shaft 31 of driven unit 22 extends through the aperture 57 in disk 56 for unrestricted rotary movement therein. As shown in the drawings, clutch element 55 is arranged for rotary movement with cover 29 of the drive unit 21.

Figure 6:
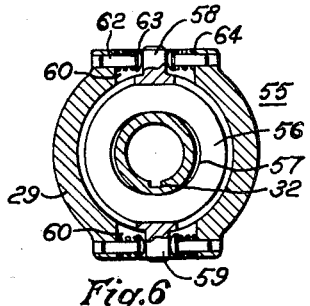
Fig. 6 is a cross sectional view of a modification of the means for pivotally mounting the clutch element on the drive member illustrated in Figs. 1 to 4.
Figure 7:
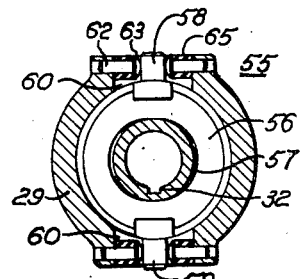
Fig. 7 is a cross sectional view of a further modification of the pivot mounting illustrated in Figs. 1 to 4 and 7.

Figs. 6 and 7 illustrate other suitable means for pivotally mounting disk 56 in cover 29. In Figs. 6 and 7 covers 29 are each provided with two rectangular slots or notches 60 in their outer peripheries extending transversely to the longitudinal axis of the covers. The notches form pockets in which are disposed the trunnions 58 and 59.

Figure 10:
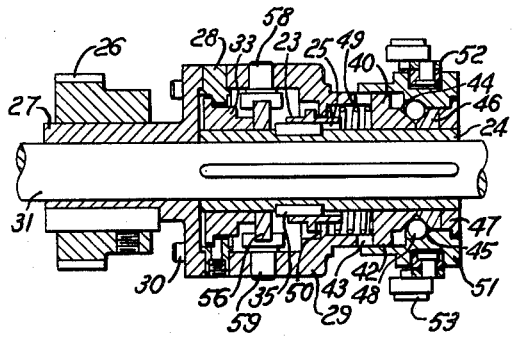
Fig. 10 is a plan view in elevation, partly in cross section, of the embodiment illustrated in Fig. 9.

In Fig. 6 the trunnions are biased toward the center of notches 60 by compression members. All of the compression members are identical and a description of one will suffice to show the structure of all. Each compression member comprises a cylindrical element 62 provided with a flanged end or head portion 63. A spring 64 encompasses the cylindrical element 62 and bears against the end of notch 60 and against the head portions 63 to bias element 62 in an elongated direction. Elongation of the compression member is restricted to the limits defined by the walls of notches 60. In the unclutched position as shown in Figs. 9 and 10 the compression members will maintain the trunnions in the center of the notches. The compression members are provided to absorb the shock of engagement of the drive and driven units. In the clutch engaged position the compression members are used to absorb the shock of sudden loads.

Fig. 7 illustrates a modification of the pivotal means illustrated in Fig. 6 wherein the compression springs 64 are replaced by any suitable resilient material such as rubber 65.

Figure 8:
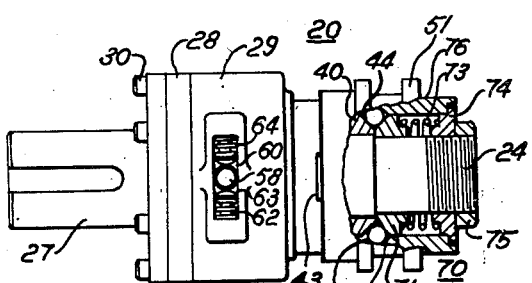
Fig. 8 is a view in elevation, partly in cross section of a modification of the transmission mechanism illustrated in Fig. 4.

Fig. 8 illustrates the transmission mechanism 20 of Figs. 1 to 5 wherein sleeve or hub 24 is lengthened to accommodate an overload release mechanism 70. To accommodate the release mechanism 70 on shaft 31 a ring 71 having a surface 72 diverging outwardly confronts surface 44 of ring 40. The opposite face of ring 71 is provided with a hub for engaging a compression spring 73 which is mounted on hub 24 between ring 71 and an adjustment ring 74. A lock nut 75 and ring 74 are carried by and are in screw threaded engagement with hub 24. A hub 76 is provided on shipper sleeve 51 to enclose the overload release mechanism 70. Ring 71 is free to rotate or move longitudinally along hub 24. Compression spring 73 allows ring 71 to move longitudinally along hub 24 when an excessive overload is applied to the clutch element 55 thereby permitting the clutch to slip until the overload has been removed.

Figs. 9 to 14 illustrate the position of the component parts of the transmission mechanism during a clutch engagement operation. In Figs. 9 and 10 the transmission mechanism is disengaged and the disk 56 of clutch element 55 is in a position substantially normal to the axis of movement of the drive shaft 31. The rotary unit 21 which may be the drive member will rotate freely without engaging or rotating the component parts of the rotary unit or driven member 22. Before a clutching engagement unit 22 may be rotated independently of unit 21. The relative rotation of units 21 and 22 may be effected with a minimum amount of friction if the component parts of the transmission mechanism are operated in oil, however, this new and improved transmission mechanism may be efficiently and satisfactorily operated in air or any other suitable gas medium and thus act as a dry clutch.

Consider now that the clutch element 55 and the rotary units 21 and 22 are in the declutching position, as shown in Figs. 9 and 10, and that the rotary unit 21 including cover 29 is rotated at a given speed. Further, consider that it is desired to synchronize the speed of rotation of unit 22 with unit 21. By rotating clutch throw lever 52 about its pivot 53, as shown in Figs. 11 and 12, the shipper sleeve 51 which is slidably and rotatably mounted on drive member 22 over the hub of housing 25 is moved to the left. The internal tapered cam surface of the shipper sleeve 51 coacts with the balls 48 to force them inwardly spreading the thrust rings 40 and the adjustment ring 46 apart by forcing ring 40 away from ring 46. The force thus exerted on the axially movable thrust ring 40 is transmitted through ring 40 against the bias of spring 64. Due to the construction of the inner race of the engaging shipper sleeve 51 any amount of end thrust of ring 40 will not dispose shipper sleeve 51. All resistance of the driven element 22 to rotary movement results in disk 56 of clutch element 55 tending to assume a position normal to the axis of rotation. This results in end thrust against sleeve 23, ring 40, balls 48 and ring 46. Ring 46 cannot move endwise and in view of the fact that diverging faces 44 and 45 of ring 40 and 46, respectively, are at the same angle, the thrust results in an outwardly exerted force on balls 48, which force is exerted at right angles to the axis of rotation and also exactly at right angles to the inner face of shipper sleeve 51. In view of the fact that the inner face of shipper sleeve 51 when in the engaged position is perpendicular to the thrust of the balls 48 there is no tendency for the balls 48 to displace sleeve 51 endwise. All internal thrust is therefore absorbed in sleeve 51. When force is exerted on sleeve 51 externally, clutch 20 is immediately thrown out of engagement. This clutch locking action can be increased to a point where it would require considerable external force to move sleeve 51 or it can be decreased to a point so that sleeve 51 has to be held forcibly in the clutch engaged position. The amount of force necessary to actuate the shipper sleeve 51 depends upon the angle of the diverging faces or surfaces 44 and 45 and the inner face of ring 51 that is encountered by balls 48 in the clutch engaged position.

In the overload release construction shown in Fig. 8 ring 71 is free to move axially on hub 24 when spring 73 is under tension by end thrust. When this happens disk 56 is free to assume a position normal to the axis of rotation and the clutch slips until the excessive overload is released.

Thrust ring 40 during this clutch engaging operation moves axially along driven member 22 to the left and lugs 42 of ring 40 are guided in the keyways 43 in the cover 29 of unit 21. At this point in the sequence of operations the cam projection surface 41 of ring 40 has not engaged cam projection surface 37 of sleeve 23. Ring 40 is always interlocked with cover 29 and rotates in unison with cover 29.

Upon further rotation of cover 29 and ring 40 the cam projection surface 41 of ring 40 engages the cam projection surface 37 of sleeve 23 and forces sleeve 23 endwise to the left. Inclined surface 36 of sleeve 23 forces the disk 56 of synchronizing clutch element 55 to pivot on its trunnions 58 and 59. Disk 56 of clutch element 55 is moved to an angular position transversely to the axis of rotation of shaft 31 against the stop formed by the inclined surface 38 of bearing sleeve 33. Surface 38 restrains disk 56 from further angular movement of the clutch element in clutch engaging direction. Disk 56 of clutch element 55 is now securely clamped between the inclined surfaces 36 and 38 and the clutch is engaged. Inasmuch as all components of the clutch mechanism are locked together the rotary units 21 and 22 must rotate in unison. Figs. 13 and 14 illustrate the transmission mechanism in locked position.

Although the operation of the transmission mechanism 20 has been described in such a manner that the rotary unit 21 has been the drive member operated by a source of power not shown and the rotary unit 22 the driven member which is rotated by the drive member 21 to perform a useful function, nevertheless, the operation may be reversed equally as well. For example, shaft 31 may be rotated by a source of power (not shown) and the rotary unit 21 synchronized with unit 22 to be rotated by unit 22 to perform a useful function.

This new and improved clutch device may be quickly and easily moved into and out of a clutching position without discontinuing or retarding the operation of the drive unit 21. Further the clutch members engage in exactly the same peripheral location each time they meet with slip-free engagement despite shock loading. Overload-release devices as illustrated in Fig. 8 may be provided if so desired. One very important feature of this new and improved clutch is that any given peripheral point on cover 29 will always be in exactly the same location with respect to any given peripheral point on hub 24 when the clutch is engaged. This is because cam projection surface 37 of sleeve 23 is not free to rotate with respect to hub 24 and cam projection surface 41 of ring 40 is not free to rotate with respect to cover 29. The only time at which the clutch elements can engage is when cam projection surface 37 and cam projection surface 41 come into alignment. The clutch mechanism 20 and particularly the drive and driven members can be engaged regardless of the direction of rotation of the drive member.

Although but a few embodiments of the present invention have been described, it will be apparent to those skilled in the art that various changes and modifications may be made therein without departing from the spirit of the invention or from the scope of the appended claims.

It is claimed and desired to secure by Letters Patent:

1. A transmission mechanism comprising a drive member, a driven member mounted in coaxial relationship with said drive member, a clutch element, means pivotally connecting said element with only one of said members to move from a position substantially normal to the axis of movement of said one of said members to an angular position inclined to said axis of movement of said one of said members, stop means provided on the other of said members to engage said element when moved into said angular position, clutch element engaging means provided on said other of said members for limited axial movement along said other of said members, means for causing said clutch element engaging means to rotate with said other of said members, and means for moving said clutch element engaging means into engagement with said element and to move said element to said angular position against said stop to lock said element and said members together to move in unison.

2. A transmission mechanism comprising a drive member, a driven member mounted in coaxial relationship with said drive member, a clutch element, means pivotally connecting said element with only said drive member to move from a position substantially normal to the axis of movement of said drive member to an angular position inclined to said axis of movement of said drive member, stop means provided on said driven member to engage said element when moved into said angular position, clutch element engaging means arranged on said driven member for limited axial movement along said driven member, means for causing said clutch element engaging means to rotate with said driven member, and means for moving said clutch element engaging means into engagement with said element and to move said element to said angular position against said stop to lock said element and said members together to move in unison.

3. A transmission mechanism comprising a drive member, a driven member mounted in coaxial relationship with said drive member, a clutch element, means pivotally connecting said element with only one of said members to move from a position substantially normal to the axis of movement of said one of said members to an angular position inclined to said axis of movement of said one of said members, stop means provided on the other of said members to engage said element when moved into said angular position, clutch element engaging means provided on said other of said members for limited axial movement along said other of said members, means for causing said clutch element engaging means to rotate with said other of said members, and means for actuating said clutch element engaging means into engagement with said element to move said element to said angular position against said stop to cause said element and said members to move in unison and for locking said element and said members together until separated by an external force.

4. A transmission mechanism comprising a drive member, a driven member mounted in coaxial relationship with said drive member, a clutch element, means pivotally connecting said element with only one of said members to move from a position substantially normal to the axis of movement of said one of said members to an angular position inclined to said axis of movement of said one of said members, stop means provided on the other of said members to engage said element when moved into said angular position, clutch element engaging means slidably mounted for limited axial movement along said other of said members, means for causing said clutch element engaging means to rotate with said other of said members, and means for moving said clutch element engaging means into engagement with said element comprising a ring rotatably attached to said drive member and loosely mounted on and movable axially along said driven member, and a cam forming a part of said ring and extending in an axial direction toward said clutch element engaging means, said cam upon engaging said clutch element engaging means causing said element to move into said angular position against said stop to lock said element and said members together to cause said members to move in unison.

5. A transmission mechanism comprising a drive member, a driven member mounted in coaxial relationship with said drive member, a clutch element comprising a disk having an aperture extending therethrough, a pair of diametrically disposed trunnions provided on the circumference of said disk, means for pivotally connecting said trunnions to said drive member for rotary movement therewith and to provide for movement of said disk from a position substantially normal to the axis of movement of said drive member to an angular position inclined to said axis of movement of said drive member, a shaft mounted on said driven member and extending through said aperture in said disk for unrestricted rotary movement therein, stop means provided on said driven member to engage said disk when said disk is moved into said angular position, a clutch engaging sleeve slidably mounted on said shaft for limited axial movement along said shaft and for rotary movement with said shaft, and means for moving said sleeve axially along said shaft into engagement with said disk to move said disk into said angular position against said stop to lock said disk, said drive member and said driven members together to cause said members to move in unison.

6. A transmission mechanism comprising a drive member, a driven member mounted in coaxial relationship with said drive member, a clutch element comprising a disk having an aperture extending therethrough, a pair of diametrically disposed trunnions provided on the circumference of said disk, means for pivotally connecting said trunnions to one of said members to provide for rotary movement of said disk with said one of said members and to provide for movement of said disk from a position substantially normal to the axis of movement of said one of said members to an angular position inclined to said axis of movement of said one of said members, a shaft mounted on the other of said members and extending through said aperture in said disk for unrestricted rotary movement therein, stop means provided on said other of said members to engage said disk when said disk is moved into said angular position, a clutch engaging sleeve mounted on said shaft for limited axial movement along said shaft and for rotary movement with said shaft, a cam forming a part of said sleeve and extending in an axial direction along said shaft, and means for moving said sleeve axially along said shaft into engagement with said disk comprising a ring rotatably attached to said one of said member and loosely mounted on and movable axially along said other of said members and a cam forming a part of said ring and extending in an axial direction toward said cam on said sleeve, said cams engaging each other to move said disk into said angular position against said stop to lock said disk and said members together to move in unison.

7. A transmission mechanism comprising a drive member, a driven member mounted in coaxial relationship with said drive member, a clutch element comprising a disk having an aperture extending therethrough, a pair of diametrically disposed trunnions provided on the circumference of said disk, means for pivotally connecting said trunnions to said drive member to provide for rotary movement with said drive member and for movement of said disk from a position substantially normal to the axis of movement of said drive member to an angular position inclined to said axis of movement of said drive member, a shaft mounted on said driven member and extending through said aperture in said disk for unrestricted rotary movement therein, stop means provided on said driven member to engage said disk when said disk is moved in one direction into said angular position and to restrain said disk from further angular movement in said one direction, a clutch engaging sleeve mounted on said shaft for limited axial movement along said shaft and for rotary movement with said shaft, a cam forming a part of said sleeve and extending in an axial direction along said shaft, and means for moving said sleeve axially along said shaft into engagement with said disk comprising a ring rotatably attached to said drive member and loosely mounted on and movable axially along said driven member, and a cam forming a part of said ring and extending in an axial direction toward said cam on said sleeve, said cams engaging each other to move said disk into said angular position against said stop to lock said disk and said members together to move in unison.

8. A transmission mechanism comprising a drive member, a driven member mounted in coaxial relationship with said drive member, a clutch element comprising a disk having an aperture formed therein to extend axially therethrough, a pair of diametrically disposed trunnions provided on the circumference of said disk, means for pivotally connecting said trunnions to one of said members to provide for rotary movement with said one of said members and for movement of said disk from a position substantially normal to the axis of movement of said one of said members to an angular position inclined to said axis of movement of said one of said members, a shaft mounted on the other of said members and extending through said aperture in said disk for unrestricted rotary movement therein, a first sleeve mounted on said other of said members for rotary movement therewith and forming a bearing means in said other of said members for said shaft, said first sleeve providing an inclined surface forming a stop to engage said disk when said disk is moved into said angular position, a second sleeve mounted on said shaft for limited axial movement along said shaft and for rotary movement with said shaft, said second sleeve providing an inclined surface for engaging the plane surface of said disk, and means for moving said second sleeve axially along said shaft causing the inclined surface of said second sleeve to engage said disk and actuating said disk into said angular position against the inclined surface of said first sleeve to lock said disk and said members together to cause said members to move in unison.

9. A transmission mechanism comprising a drive member, a driven member mounted in coaxial relationship with said drive member, a clutch element comprising a disk having an aperture formed therein to extend axially therethrough, a pair of diametrically disposed trunnions provided on the circumference of said disk, means for pivotally connecting said trunnions to said drive member to provide for rotary movement of said disk with said drive member and for movement of said disk from a position substantially normal to the axis of movement of said drive member to an angular position inclined to said axis of movement of said drive member, a shaft mounted on said driven member and extending through said aperture in said disk for unrestricted rotary movement therein, a first sleeve mounted on said drive member for rotary movement therewith and forming a bearing means in said drive member for said shaft, said first sleeve providing an inclined surface forming a stop to engage said disk when said disk is moved in one direction into said angular position and to restrain said disk from further angular movement in said one direction, a second sleeve mounted on said shaft for limited axial movement along said shaft and for rotary movement with said shaft, said second sleeve providing an inclined surface for engaging the plane surface of said disk, and means for moving said second sleeve axially along said shaft causing the inclined surface of said second sleeve to engage said disk and actuating said disk into said angular position against the inclined surface of said first sleeve to lock said disk, said drive member and said driven member together to cause said members to move in unison.

10. A transmission mechanism comprising a drive member, a driven member mounted in coaxial relationship with said drive member, a clutch element comprising a disk having an aperture formed therein to extend axially therethrough, a pair of diametrically disposed trunnions provided on the circumference of said disk, means for pivotally connecting said trunnions to said drive member to provide for rotary movement of said disk with said drive member and for movement of said disk from a position substantially normal to the axis of movement of said drive member to an angular position inclined to said axis of movement of said drive member, a shaft mounted on said driven member and extending through said aperture in said disk for unrestricted rotary movement therein, a first sleeve mounted on said drive member for rotary movement therewith and forming a bearing means in said drive member for said shaft, said first sleeve providing an inclined surface forming a stop to engage said disk when said disk is moved in one direction into said angular position and to restrain said disk from further angular movement in said one direction, a second sleeve mounted on said shaft for limited axial movement along said shaft and for rotary movement with said shaft, said second sleeve providing an inclined surface for engaging the plane surface of said disk, and a cam projecting surface forming a part of said second sleeve and extending in an axial direction along said shaft, and means for moving said second sleeve axially along said shaft into engagement with said disk comprising a ring loosely mounted on said driven member and movable axially along said driven member in locked position with said drive member, and a cam forming a part of said ring and extending in an axial direction toward said cam on said second sleeve, said cams engaging each other to move said disk into said angular position against said stop to lock said disk and said members together to move in unison.

11. A transmission mechanism comprising a drive member comprising a cover provided with a plurality of longitudinally extending slots, a driven member mounted in coaxial relationship with said drive member, a clutch element comprising a disk having an aperture extending therethrough, a pair of diametrically disposed trunnions provided on the circumference of said disk, means for pivotally connecting said trunnions to said drive member to provide for rotary movement with said drive member and for movement of said disk from a position substantially normal to the axis of movement of said drive member to an angular position inclined to said axis of movement of said drive member, a shaft mounted on said driven member and extending through said aperture in said disk for unrestricted rotary movement therein, stop means provided on said driven member to engage said disk when said disk is moved in one direction into said angular position and to restrain said disk from further angular movement in said one direction, a clutch engaging sleeve mounted on said shaft for limited axial movement along said shaft and for rotary movement with said shaft, a cam forming a part of said sleeve and extending in an axial direction along said shaft, and means for moving said sleeve axially along said shaft into engagement with said disk comprising a ring loosely mounted on said driven member and provided with a plurality of lugs extending around the periphery thereof, said ring upon movement axially along said driven member causing said lugs to move in said longitudinally extending slots of said cover in lock position with cover, and a cam forming a part of said ring and extending in an axial direction toward said cam on said sleeve, said cams engaging each other to move said disk into said angular position against said stop to lock said disk and said members together to move in unison.

12. A transmission mechanism comprising a drive member, a driven member mounted in coaxial relationship with said drive member, a clutch element comprising a disk having an aperture extending therethrough, a pair of diametrically disposed trunnions provided on the circumference of said disk, means for pivotally connecting said trunnions to one of said members to provide for rotary movement of said disk with said one of said members and to provide for movement of said disk from a position substantially normal to the axis of movement of said one of said members to an angular position inclined to said axis of movement of said one of said members, a shaft mounted on the other of said members and extending through said aperture in said disk for unrestricted rotary movement therein, stop means provided on said other of said members to engage said disk when said disk is moved into said angular position, a clutch engaging sleeve mounted on said shaft for limited axial movement along said shaft and for rotary movement with said shaft, a cam forming a part of said sleeve and extending in an axial direction along said shaft, a first ring loosely mounted on said other of said members and movable axially along said other of said members in locked position with said one of said members, a cam forming a part of said first ring and extending in an axial direction toward said cam on said sleeve, said first ring providing an outwardly diverging surface, a second ring provided with an outwardly diverging surface abutting said diverging surface of said first ring, spring means for biasing said first ring toward said second ring, a plurality of balls arranged in the notch formed by the diverging surfaces of said first and second rings, a shipper sleeve slidably and rotatably fitted over said balls, and means for reciprocating said shipper sleeve to cause said cams to engage each other to move said disk into said angular position against said stop to lock said disk and said members together.

13. A transmission mechanism comprising a drive member comprising a cover provided with a plurality of longitudinally extending slots, a driven member mounted in coaxial relationship with said drive member, a clutch element comprising a disk having an aperture extending therethrough, a pair of diametrically disposed trunnions provided on the circumference of said disk, means for pivotally connecting said trunnions to said drive member to provide for rotary movement with said drive member and for movement of said disk from a position substantially normal to the axis of movement of said drive member to an angular position inclined to said axis of movement of said drive member, a shaft mounted on said driven member and extending through said aperture in said disk for unrestricted rotary movement therein, stop means provided on said driven member to engage said disk when said disk is moved in one direction into said angular position and to restrain said disk from further angular movement in said one direction, a clutch engaging sleeve mounted on said shaft for limited axial movement along said shaft and for rotary movement with said shaft, a cam forming a part of said sleeve and extending in an axial direction along said shaft, a first ring loosely mounted on said driven member and provided with a plurality of lugs extending around the periphery thereof, said first ring upon movement axially along said driven member causes said lugs to move in said longitudinally extending slots of said cover in lock position with said cover, and a cam forming a part of said first ring and extending in an axial direction toward said cam on said sleeve, said first ring providing an outwardly diverging surface, a second ring provided with an outwardly diverging surface abutting said diverging surface of said first ring, spring means for biasing said first ring toward said second ring, a plurality of balls arranged in the notch formed by the diverging surfaces of said first and second rings, a shipper sleeve slidably fitted over said balls, and means for reciprocating said shipper sleeve to cause said cams to engage each other to move said disk into said angular position against said stop to lock said disk and said members together.

References Cited in the file of this patent

UNITED STATES PATENTS

| | | |
|---|---|---|
| 1,327,880 | Rogers | Jan. 13, 1920 |
| 2,103,791 | Pepper et al. | Dec. 28, 1937 |

FOREIGN PATENTS

| | | |
|---|---|---|
| 291,879 | Great Britain | June 11, 1928 |